(12) United States Patent
Sekine

(10) Patent No.: US 7,980,267 B2
(45) Date of Patent: Jul. 19, 2011

(54) FLUID SUPPLY DEVICE AND FUEL CELL SYSTEM WITH THE SAME

(75) Inventor: Hiroyuki Sekine, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1178 days.

(21) Appl. No.: 10/589,965

(22) PCT Filed: Mar. 15, 2005

(86) PCT No.: PCT/JP2005/005042

§ 371 (c)(1),
(2), (4) Date: Aug. 18, 2006

(87) PCT Pub. No.: WO2005/088183

PCT Pub. Date: Sep. 22, 2005

(65) Prior Publication Data

US 2007/0163658 A1    Jul. 19, 2007

(30) Foreign Application Priority Data

Mar. 17, 2004  (JP) ................................ 2004-076772

(51) Int. Cl.
*B29C 47/68* (2006.01)
(52) U.S. Cl. ............................ 137/545; 55/487; 429/515
(58) Field of Classification Search .......... 137/544–550, 137/565.34; 55/467, 482, 486, 487, 315, 55/342, 351; 210/258, 335, 416.1, 459; 429/400, 429/408, 410, 515

See application file for complete search history.

(56) References Cited

U.S. PATENT DOCUMENTS

| | | | | |
|---|---|---|---|---|
| 2,513,795 | A * | 7/1950 | Gliss | 137/545 |
| 4,023,472 | A * | 5/1977 | Grunder et al. | 55/482 |
| 5,733,441 | A * | 3/1998 | Ko et al. | 210/90 |
| 5,988,213 | A * | 11/1999 | Yoshioka | 137/565.15 |
| 6,206,037 | B1 * | 3/2001 | Murakoshi et al. | 137/565.34 |
| 6,436,562 | B1 * | 8/2002 | DuBose | 429/408 |
| 6,723,460 | B2 * | 4/2004 | Derflinger et al. | 429/410 |
| 6,783,881 | B2 * | 8/2004 | Stenersen et al. | 429/410 |

FOREIGN PATENT DOCUMENTS

| | | |
|---|---|---|
| DE | 26 52 344 A1 | 5/1977 |
| DE | 132 533 C | 10/1978 |
| JP | A-62-157224 | 7/1987 |
| JP | A-2-56209 | 2/1990 |
| JP | U 02-028963 | 2/1990 |
| JP | U 05-087277 | 11/1993 |
| JP | A-9-319268 | 12/1997 |
| JP | A 10-281386 | 10/1998 |
| JP | A-2000-2376 | 1/2000 |
| JP | A 2000-176227 | 6/2000 |
| JP | A-2000-186814 | 7/2000 |
| JP | A-2002-373687 | 12/2002 |
| JP | A 2003-036870 | 2/2003 |
| JP | A 2003-197248 | 7/2003 |

* cited by examiner

*Primary Examiner* — Stephen M Hepperle
*Assistant Examiner* — Andrew J Rost
(74) *Attorney, Agent, or Firm* — Oliff & Berridge, PLC

(57) ABSTRACT

The present invention is a fluid supply device having a bellows shaped pipe 21 midway in fluid supply piping, comprising: first filter means 19a that traps foreign matter in the fluid on the upstream side of the bellows shaped pipe 21; and second filter means 22 that traps foreign matter in the fluid discharged from the pipe 21 on the downstream side of the bellows shaped pipe 21.

3 Claims, 3 Drawing Sheets

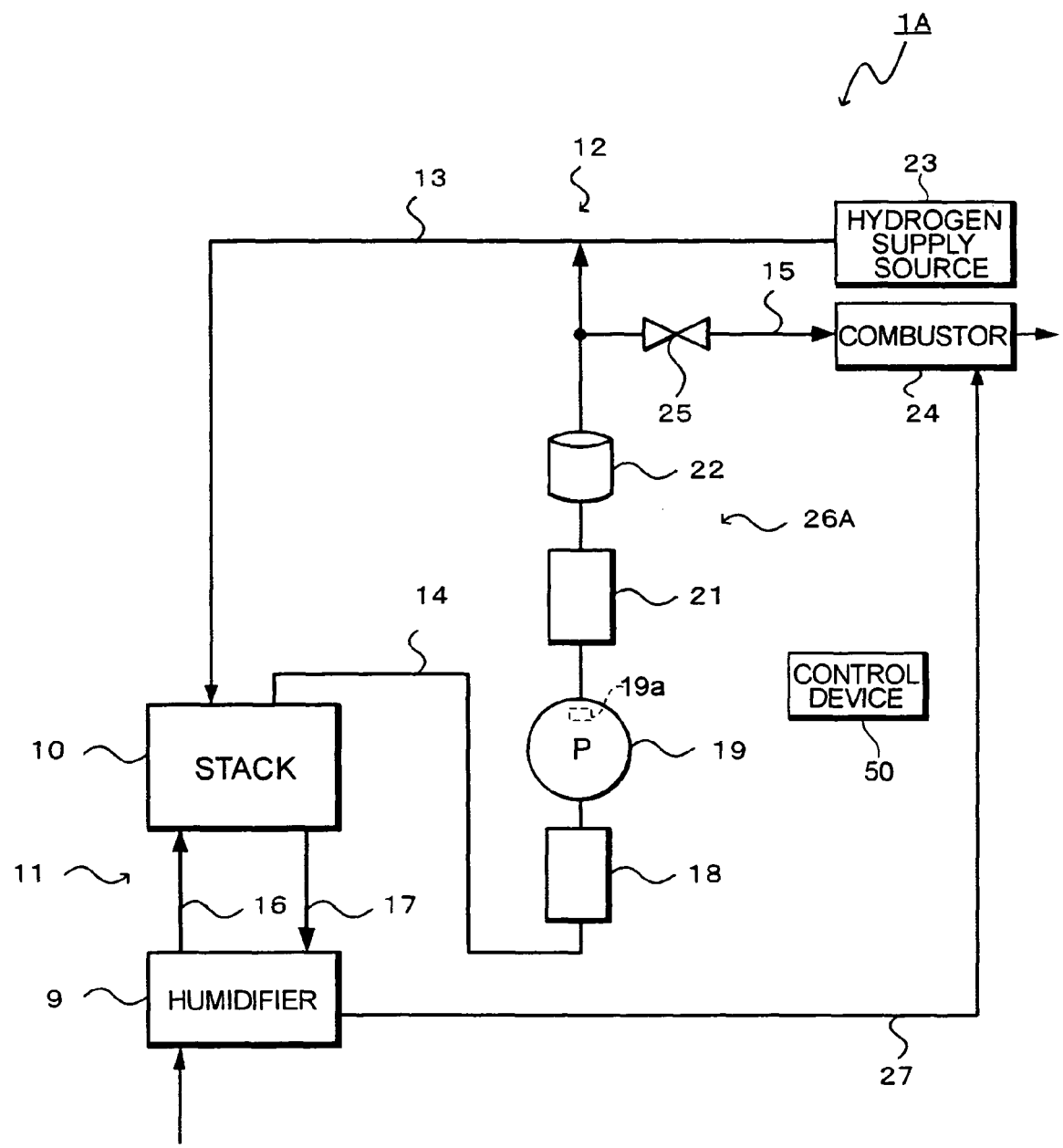

FLUID SUPPLY DEVICE AND FUEL CELL SYSTEM WITH THE SAME

BACKGROUND

The present invention relates to a fluid supply device for supplying fluid to devices to be supplied, and a fuel cell system comprising the same.

Technology for preventing the occurrence of problems in devices that are to be supplied, caused by foreign matter in fluids has been disclosed in Japanese Utility Model Laid-open No. H5-87277 (Patent Document 1). In this Japanese Utility Model Laid-open No. H5-87277, technology is disclosed in which a filter is arranged in a pump discharge path to remove particles of wear and the like generated in the pump.

Also, when devices that generate vibrations such as pumps are arranged on a flow path, and when it is necessary to prevent these vibrations from being transmitted to other piping or the like, in for example Japanese Patent Application Laid-open No. H10-281386 technology is disclosed in which flexible piping (bellows piping) is arranged on the discharge side and the intake side of the pump (Patent Document 2).

[Patent Document 1] Japanese Utility Model Application Laid-open No. H5-87277

[Patent Document 2] Japanese Patent Application Laid-open No. H10-281386

[Patent Document 3] Japanese Patent Application Laid-open No. 2003-36870

SUMMARY

However, bellows piping arranged on the discharge side of pumps or similar can absorb the vibrations of pumps by extension and contraction of the corrugated portion that forms the shape of the bellows, but it is easy for fluid to stagnate in the corrugated portion, and as a result if there is foreign matter in the fluid that is introduced the foreign matter can adhere, deposit, and agglomerate.

Therefore even if a filter is arranged on the discharge side of the pump as described in Japanese Utility Model Application Laid-open No. H5-87277, if bellows piping is arranged downstream of the pump to absorb vibrations, foreign matter that passes through the filter will be deposited in the corrugated portion and agglomerate, and can cause problems in the equipment being supplied on the downstream side due to peeling discharge of the agglomerated foreign matter. Also, from the viewpoint of good piping design, if piping (for example, L-shaped piping) is provided at parts to change the direction of flow of the introduced fluid downstream of a pump, the fluid can easily stagnate at these parts also, and problems can be caused in the same way.

Therefore it is an object of the present invention to provide a fluid supply device and a fuel cell system with the same capable of preventing the occurrence of problems in the equipment supplied on the downstream side even when there are parts in the piping where the introduced fluid can easily stagnate, such as bellows piping, by deposition of the foreign matter in the fluid in those parts.

The fluid supply device according to an embodiment of the present invention is a fluid supply device having a flexible portion midway in fluid supply piping, comprising: first filter means that traps foreign matter in the fluid on the upstream side of the flexible portion; and second filter means that traps foreign matter in the fluid discharged from the flexible portion on the downstream side of the flexible portion.

According to this configuration, even when foreign matter in the fluid that has passed the first filter means is deposited and agglomerates in the flexible portion, and subsequently peels from and is discharged from the flexible portion, the second filter means provided downstream of the flexible portion can trap the agglomerated foreign matter. In this way, it is possible to properly supply fluid to devices arranged downstream of the flexible portion without causing operational faults.

The flexible portion reduces or absorbs vibrations or thermal expansion in the fluid supply piping, and can be formed from for example bellows shaped piping, expansion joints, L-bends, Z-bends, or U-bends. Flexible portions of this type include parts that change the direction of flow of the introduced fluid.

Pressurization means that pressurizes fluid taken in from the upstream side and transmits the fluid towards the downstream side is provided on the upstream side of the flexible portion, and the first filter means may be provided within the pressurization means or between the pressurization means and the flexible portion.

According to this configuration, when for example a fluid pump is used as the pressurization means, even when wear particles and other foreign matter associated with the operation of the fluid pump is mixed with the fluid, fluid can be properly supplied to devices arranged downstream of the flexible portion without causing operational faults.

It is desirable that the filter accuracy of the second filter means is lower than that of the first filter means.

According to this configuration it is possible to reduce clogging in the second filter means and to delay the increase in pressure losses.

A fluid supply device according to another embodiment of the present invention is a fluid supply device having a flexible portion midway in fluid supply piping, comprising: first filter means that traps foreign matter in the fluid on the upstream side of the flexible portion; and deposition suppression means, provided between the first filter means and the flexible portion, that suppresses deposition, in the flexible portion, of foreign matter in fluid that has passed the first filter means.

According to this configuration, when from the viewpoint of good piping design a flexible portion such as for example a bellows shaped pipe is provided on the downstream side of the first filter means, deposition of foreign matter in places where foreign matter in the fluid that has passed the first filter means can easily deposit and agglomerate, for example the corrugations of the flexible portion due to stagnation of the fluid in the corrugations, can be prevented by the deposition suppression means. In this way, it is possible to properly supply fluid to devices arranged downstream of the flexible portion without causing operational faults.

The deposition suppression means may be flow varying means that varies the flow of fluid introduced into the flexible portion. Also, The flow varying means may be a shutoff valve, and the flow is varied by controlling the opening and closing of the shutoff valve.

The flexible portion is for example a bellows shaped pipe.

According to this configuration, even when a pipe formed in a bellows shape is arranged on the discharge side of the first filter means for the purpose of absorbing vibrations or similar, the deposition suppression means can prevent foreign matter in the fluid from depositing and agglomerating in the bellows shaped part (corrugations).

A fluid pump may be provided between the first filter means and the flexible portion. Or, a fluid pump having built-in first filter means may be provided.

According to these configurations, vibrations of the fluid pump can be absorbed by the flexible portion, and foreign matter generated by operation of the fluid pump can be prevented from depositing and agglomerating in the flexible portion by the deposition prevention means.

The fuel cell system according to the present invention incorporates the fluid supply device according to the present invention as described above in the reaction gas supply system. The reaction gas supply system that incorporates this fluid supply device may be either the fuel gas supply system or the oxidizing gas supply system.

According to this configuration, it is possible to provide a fuel cell system incorporating a fluid supply device capable of properly supplying fluid to devices arranged downstream of a flexible portion as described above, without causing operational faults. For example, in the hydrogen gas piping system of a fuel cell system for a vehicle, wear particles or other foreign matter generated by the operation of the hydrogen pump (pressurizing means, fluid pump) do not cause operational faults in devices downstream, and the vehicle can be driven smoothly and stably. The same applies to a compressor (pressurization means, fluid pump) in the oxygen gas supply system of the fuel cell system of a vehicle.

Yet another embodiment of the fluid supply device according to the present invention is a fluid supply device that includes piping into which fluid that has passed filter means to trap foreign matter in the fluid is introduced and is discharged downstream, and when the piping includes parts that change the direction of the introduced fluid, deposition suppression means is provided to suppress deposition of foreign matter in these parts from fluid that has passed the filter means.

According to this configuration, when piping provided with parts that change the direction of the introduced fluid is provided on the discharge side of the filter means from the viewpoint of piping design, deposition of foreign matter can be prevented by the deposition suppression means in places where foreign matter in the fluid that has passed the first filter means can easily deposit and agglomerate due to stagnation of the fluid at those places on the pipe. In this way, it is possible to properly supply fluid to devices arranged downstream of the piping without causing operational faults.

The piping may be formed in the shape of bellows.

According to this configuration, even when a pipe formed in a bellows shape (bellows pipe) is arranged on the discharge side of the filter means for the purpose of absorbing vibrations or similar, the deposition suppression means can prevent foreign matter in the fluid from depositing and agglomerating in the bellows shaped part.

Also, another embodiment of the fluid supply device according to the present invention is a fluid supply device that includes piping into which fluid that has passed first filter means to trap foreign matter in the fluid is introduced and is discharged downstream, and when the piping includes parts that change the direction of the introduced fluid, second filter means is provided on the discharge side of the piping to trap foreign matter in the introduced fluid.

According to this configuration, even when foreign matter in the fluid that passed the first filter means is deposited and agglomerates in these parts of the pipe, and subsequently peels from these parts and is discharged, the second filter means provided on the downstream side of the piping can trap the agglomerated foreign matter. In this way, fluid can be properly supplied to devices arranged downstream of the piping without causing operational faults.

The piping may be formed in a bellows shape.

According to this configuration, when a pipe formed in a bellows shape (bellows pipe) is arranged on the discharge side of the first filter means for the purpose of absorbing vibrations or similar, even if foreign matter in the fluid that has passed the first filter means adheres and agglomerates in the bellows shaped part, and subsequently peels and is discharged, it can be removed by the second filter means.

It is desirable that the filter accuracy of the second filter means is lower than that of the first filter means.

According to this configuration, clogging of the second filter means can be reduced and the increase in pressure losses can be delayed.

Also, a fluid supply device according to another embodiment of the present invention is a fluid supply device including a circulation means that circulates fluid in the flow path by taking in and discharging fluid, and piping into which fluid discharged by the circulation means is introduced and is discharged downstream, wherein if the piping has parts that change the direction of the introduced fluid, filter means that traps foreign matter generated by the operation of the circulation means is provided on the discharge side of the piping.

According to this configuration, when the piping has parts that change the direction of the introduced fluid arranged on the discharge side of the circulation means, even if foreign matter generated by the operation of the circulation means adheres and agglomerates in these parts and subsequently peels off and is discharged, the agglomerated foreign matter can be trapped by the second filter means provided on the discharge side of the piping. In this way, fluid can be properly supplied to devices arranged downstream of the piping without causing operational faults.

It is desirable that the circulation means is a pump.

According to this configuration, when a pump is used as the circulation means, even when wear particles or other foreign matter is generated by the operation of the pump, fluid can be properly supplied to devices arranged downstream of the piping without causing operational faults.

It is desirable that the piping is formed in a bellows shape.

According to this configuration, vibrations of the pump can be absorbed by the piping expanding and contracting in the shape of a bellows, also even if foreign matter generated by the operation of the pump deposits and agglomerates in the bellows shaped part and subsequently peels off and is discharged, the foreign matter can be removed by the filter means.

It is desirable that circulation filter means that traps foreign matter generated by the operation of the circulation means is provided within the circulation means.

According to this configuration, fluid can be supplied to the piping after being filtered by the circulation filter means.

It is desirable that the filter accuracy of the filter means is lower than that of the circulation filter means.

According to this configuration, it is possible to reduce clogging of the filter means and delay the increase in pressure losses.

DESCRIPTION OF DRAWINGS

FIG. 3 is a diagram showing the configuration of the main parts of a fuel cell system according to the second embodiment.

DETAILED DESCRIPTION

The following is an explanation of the fluid supply device and fuel cell system using the same according to the best mode for carrying out the present invention. In this embodiment an example of the fluid supply device according to the present invention applied to the fuel gas piping (for example hydrogen gas piping) of a fuel cell system is explained.

First Embodiment

Figure 1:
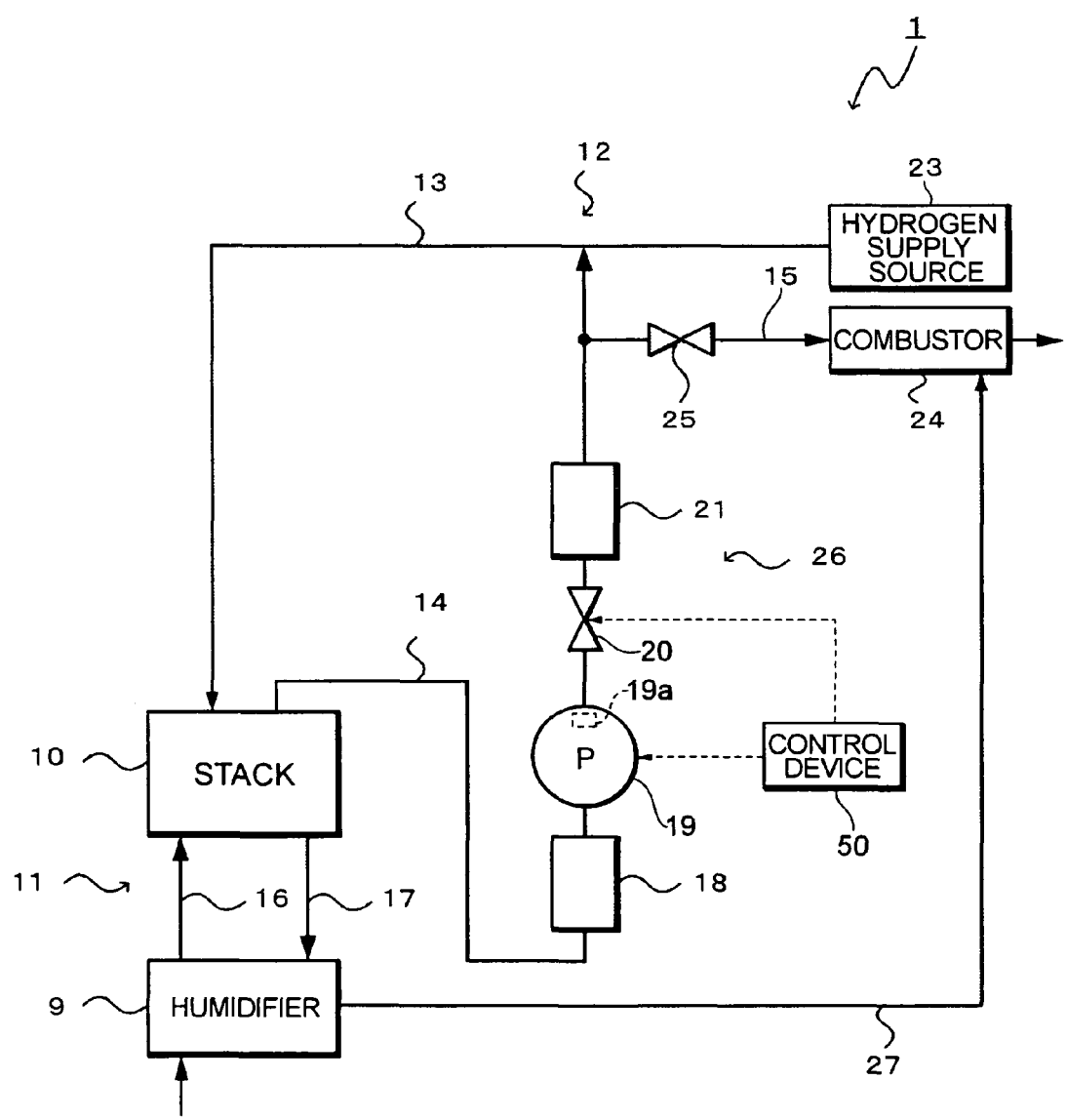
FIG. 1 is a diagram showing the configuration of the main parts of a fuel cell system according to the first embodiment.
Figure 2:
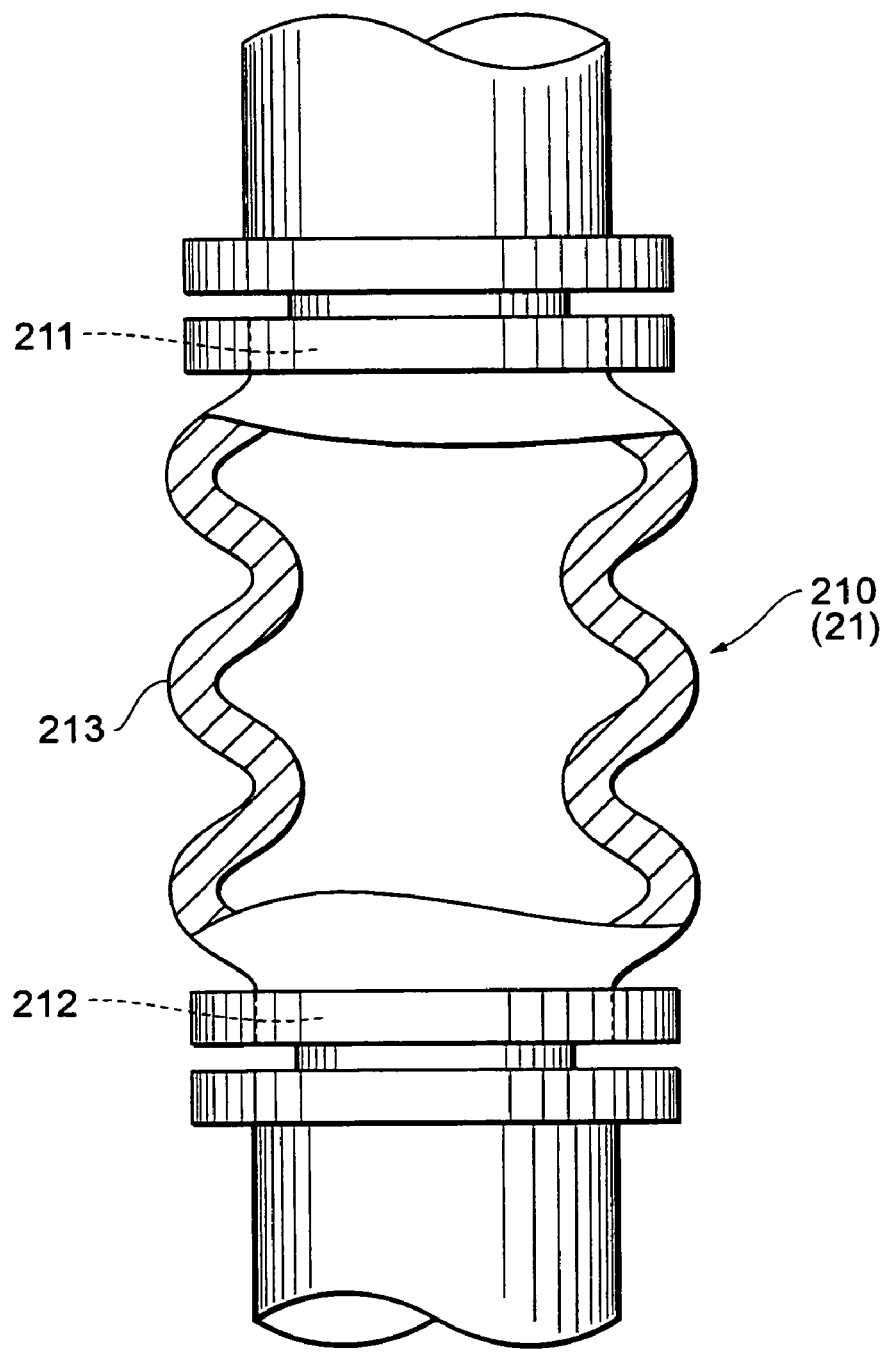
FIG. 2 is a sectional view showing the sectioned second bellows pipe according to the first embodiment.

First, a first embodiment of the present invention is explained using FIGS. 1 and 2. FIG. 1 is a diagram showing the configuration of the main parts of a fuel cell system according to the first embodiment. FIG. 2 is a view showing the second bellows pipe partially sectioned according to the first embodiment.

In the first embodiment, it is explained that in order to prevent the occurrence of problems in the equipment being supplied on the downstream side, even though the piping includes parts in which the introduced fluid can easily stagnate (second bellows pipe, flexible portion) arranged in the flow path, a deposition suppression device is provided to suppress deposition of foreign matter in the fluid at these parts.

First the configuration of the fuel cell system is simply explained. As shown in FIG. 1, the fuel cell system 1 according to the present invention includes a solid polymer electrolysis type stack (fuel cell) 10 that receives a supply of oxygen gas (air) through an oxygen gas (reaction gas) piping system 11 and hydrogen gas through a hydrogen gas (reaction gas) piping system 12, and generates electrical power.

The stack 10 is made by laminating of a plurality of cells, formed from a solid polymer electrolysis membrane sandwiched between an anode (hydrogen electrode) and a cathode (air electrode) that are further sandwiched on both sides by a pair of separators. When hydrogen gas and oxygen gas is supplied to each cell, the stack 10 generates electricity by an electrochemical reaction. When the fuel cell system 1 is installed in a vehicle, the generated electricity becomes the power source of the vehicle, which is supplied to motors and the like.

The oxygen gas piping system 11 includes an oxygen gas supply flow path 16 that supplies oxygen gas humidified in a humidifier 9 to the stack 10, an oxygen offgas flow path 17 that leads oxygen offgas discharged from the stack 10 to the humidifier 9, and an oxygen offgas exhaust flow path 27 that leads the oxygen offgas from the humidifier 9 to a combustor 24.

The hydrogen gas piping system 12 includes a hydrogen gas supply flow path 13 that supplies hydrogen gas from a hydrogen supply source 23 such as a high pressure hydrogen gas storage tank or similar to the stack 10, a hydrogen offgas circulation flow path 14 that returns hydrogen offgas discharged from the stack 10 to the hydrogen gas supply flow path 13, and a hydrogen offgas discharge flow path 15 that branches off the hydrogen offgas circulation flow path 14.

The hydrogen gas piping system 12 supplies fresh hydrogen gas supplied from the hydrogen supply source 23 and hydrogen offgas returned by the hydrogen offgas circulation flow path 14 to the stack 10. An anode purge valve 25 is installed on the hydrogen offgas discharge flow path 15 as a shut-off valve to open and close the hydrogen offgas discharge flow path hydrogen offgas discharge flow path 15. By opening the anode purge valve 25 foreign matter in the hydrogen offgas is lead to the combustor 24 together with the hydrogen offgas.

Next the hydrogen offgas circulation flow path 14 to which the fluid supply device 26 according to the present invention is applied is explained in detail.

The hydrogen offgas circulation flow path 14 includes a first bellows pipe 18, a hydrogen pump (circulation means, pressure raising means, fluid pump) 19, a circulation side shut-off valve 20 that opens and closes the hydrogen offgas circulation flow path 14, and a second bellows pipe (flexible portion, bellows shaped pipe) 21 in that order in the downstream direction from the stack 10.

According to this configuration, hydrogen offgas associated with power generation in the stack 10 is pressurized by the hydrogen pump 19 after passing through the first bellows pipe 18, and merges with the hydrogen gas supply flow path 13 via the second bellows pipe 21. Vibration displacements caused by operation of the hydrogen pump 19 are absorbed by the first bellows pipe 18 and the second bellows pipe 21 provided on the intake side and the discharge side respectively of the hydrogen pump 19.

The first bellows pipe 18 is a pipe formed in the shape of a bellows that absorbs vibrations caused by operation of the hydrogen pump 19 by expanding and contracting in the shape of a bellows. A shape other than a bellows shape may be adopted if the function of absorbing vibrations is provided. For example, expansion joints, L-bends, Z-bends, and U-bends may be adopted. Also, depending upon the specification, it may be possible to omit the first bellows pipe 18 upstream of the hydrogen pump.

The hydrogen pump 19 circulates fluid, in other words hydrogen offgas, in the flow path by pressurizing and transmitting the hydrogen offgas discharged from the stack 10, and an arbitrary type may be adopted in accordance with the specification of the hydrogen gas piping system 12. For example, a scroll pump or other type of fluid pump may be adopted.

Also, although not shown on the drawings the hydrogen pump 19 includes a pump chamber, an intake unit that introduces the hydrogen offgas into the pump chamber, and a discharge unit that transmits the hydrogen offgas that has been pressurized in the pump chamber, the intake unit and the discharge unit are connected to the hydrogen offgas circulation flow path 14.

Also, in this type of hydrogen pump 19 particles of wear and other foreign matter is generated by sliding in the hydrogen pump 19, so the hydrogen pump includes pump filter means (first filter means) 19a to trap the generated foreign matter. In this case the pump filter means 19a is adopted to suit the fluid to be filtered, the characteristics of the foreign matter to be trapped, the required removal ratio, and so on. For example, a mesh shaped filter with a uniform void ratio or similar may be adopted.

Next, the second bellows pipe 21 is a pipe formed in the shape of a bellows that absorbs vibrations caused by operation of the hydrogen pump 19 by expanding and contracting in the shape of a bellows. The configuration of the second bellows pipe 21 may be adopted in accordance with the specification of the hydrogen pump 19, but for example it is considered that the configuration shown in FIG. 2 may be adopted.

FIG. 2 is a view showing the partly sectioned second bellows pipe 21. The second bellows pipe 21 includes a main body 210 made from rubber for example, an inlet unit 211 that introduces hydrogen offgas to the main body, and a discharge unit 212 that discharges hydrogen offgas from the main body, the inlet unit 211 and the discharge unit 212 are connected to the hydrogen offgas circulation flow path 14. The main body 210 includes corrugations (bellows) 213 in the shape of a bellows to absorb vibrations generated by operation of the hydrogen pump 19.

In the second bellows pipe 21, the hydrogen offgas introduced from the inlet unit 211 can easily stagnate at the internal walls of the corrugations 213, and foreign matter that has passed through the pump filter means 19a can easily adhere to the depressions in the internal walls of the corrugations 213 and agglomerate. Then the agglomerated foreign matter can peel off, and hydrogen offgas that contains the agglomerated foreign matter from the second bellows pipe 21 is discharged from the discharge unit 212.

Besides a bellows shaped pipe, the second bellows pipe 21 may adopt the shape of an expansion joints, L-bends, Z-bends, or U-bends, and similar.

The circulation side shutoff valve 20 is a valve that opens and closes the hydrogen offgas circulation flow path 14, and by arranging the circulation side shutoff valve 20 downstream of the hydrogen pump 19 and upstream of the second bellows pipe 21, the circulation side shutoff valve 20 functions as deposition suppression means to suppress the deposition of foreign matter in the fluid in the corrugations 213 of the second bellows pipe 21. Opening and closing of the circulation side shutoff valve 20 is controlled by a control device (ECU) 50. The control device 50 can change the flow of hydrogen offgas introduced to the second bellows pipe 21 by controlling the opening and closing of the circulation side shutoff valve 20.

In this way, by varying the flow of hydrogen offgas introduced into the second bellows pipe 21 by the operation of opening and closing the circulation side shutoff valve 20, stagnation of the hydrogen offgas introduced into the second bellows pipe 21 on the internal walls of the corrugations 213 is prevented, and before foreign matter that has adhered to the internal walls of the corrugations 213 agglomerates, the foreign matter can be discharged.

Therefore, according to the fluid supply device 26 and fuel cell system 1 of the present embodiment, the flow of hydrogen offgas introduced into the second bellows pipe 21 can be varied by the operation of opening and closing the circulation side shutoff valve 20, so it is possible to prevent foreign matter that has passed through the pump filter means 19a from being deposited on the corrugations 213 of the second bellows pipe 21 and agglomerating.

As a result, it is possible to prevent the occurrence of problems in the stack 10 or similar arranged downstream, even when the second bellows pipe 21 is arranged on the discharge side of the hydrogen pump 19 to absorb vibrations.

It is possible to adopt a configuration other than the circulation side shutoff valve 20 as the deposition prevention means to prevent deposition of foreign matter in the corrugations 213 of the second bellows pipe 21. For example, a control plate may be provided at a predetermined position within the second bellows pipe 21 to vary the flow of hydrogen offgas. Also, a vibration device that applies vibrations to the second bellows pipe 21 from the outside may be provided on the second bellows pipe 21.

Second Embodiment

Next, the second embodiment of the present invention is explained using FIG. 3. FIG. 3 is a diagram showing the main parts of a fuel cell system according to the present embodiment. The second embodiment differs from the first embodiment in that instead of the circulating side shutoff valve 20, filter means is provided on the discharge side (downstream side) of the second bellows pipe 21 to trap foreign matter, and the rest of the configuration is the same as in the first embodiment. Therefore, the same reference numerals have been applied to the same configuration, and their explanation has been omitted.

Filter means (second filter means) 22 traps deposited material that has been generated by the operation of the hydrogen pump (pressurization means, flow pump) 19 for example, and has deposited and agglomerated in the corrugations 213 of the second bellows pipe (flexible portion) 21, and is provided on the discharge side (downstream side) of the second bellows pipe 21.

The filter means 22 may be adopted to suit the fluid to be filtered, the characteristics of the foreign matter to be trapped, the required removal ratio, and so on, but for example a mesh shaped filter with a uniform void ratio or similar may be adopted.

The filter means 22 is made from a material such as nylon or similar, for example, and although not shown in the drawings includes a main body that includes a filter mesh, an inlet unit that introduces hydrogen offgas to the main body, and a discharge unit that transmits the hydrogen offgas from the main body, and the inlet unit and the discharge unit are connected to the hydrogen offgas circulation flow path 14.

Even if the hydrogen offgas introduced into the filter means 22 contains foreign matter that has agglomerated in the second bellows pipe 21, the filter means 22 can trap the foreign matter. Therefore, foreign matter that agglomerates in the second bellows pipe 21 is removed when the fluid passes through the filter means 22, so the foreign matter will not damage devices arranged downstream.

It is desirable that the filtering accuracy of the filter means 22 is determined in accordance with the characteristics of the foreign matter to be trapped, the required removal ratio, and the type of hydrogen pump 19. For example, as explained in the first embodiment when the hydrogen pump 19 includes pump filter means (first filter means) 19a, the filter means (second filter means) 22 should trap deposited material of foreign matter that has passed the pump filter means 19a and that has agglomerated in the second bellows pipe 21, so it is desirable that the filter mesh be provided in accordance with the particle diameter of agglomerated deposited material.

In this case, the filter accuracy of the filter means 22 may be equal to or less than that of the pump filter means 19a (the filter mesh provided in the filter means 22 may be coarser than the filter mesh provided in the pump filter means 19a), so it is possible to reduce clogging of the filter means 22 and delay the increase in pressure losses.

Also, the filter means 22 should remove agglomerated foreign matter, so a filter with an area smaller than the area of the pump filter means 19a may be adopted.

In contrast to this, if the hydrogen pump 19 does not include pump filter means 19a, it is necessary to trap both foreign matter generated by the operation of the hydrogen pump 19 and material deposited and agglomerated in the second bellows pipe 21, so it is desirable to provide a filter mesh in the filter means 22 in accordance with the particle diameter of foreign matter generated by operation of the hydrogen pump 19. In this way it is possible to reduce the number of filter means provided on the flow path.

According to the fluid supply device 26A and fuel cell system 1A of the present embodiment, when the second bellows pipe 21 is arranged on the discharge side of the hydrogen pump 19 to absorb vibrations, after foreign matter that has been generated by the operation of the hydrogen pump 19 is deposited and agglomerates in the corrugations 213 of the second bellows pipe 21, even if peeling occurs the agglomerated foreign matter can be trapped by the filter means 22 arranged on the discharge side of the second bellows pipe 21.

As a result, it is possible to prevent agglomerated foreign matter from flowing into devices arranged downstream of the second bellows pipe 21, so it is possible to prevent the occurrence of problems such as sealing defects of the anode purge valve 25 or damage to cells within the stack 10.

[Others]

The present invention has been explained above using the best mode for carrying out the invention, but the present invention is not limited to the above embodiments. A person skilled in the art can make suitable changes and improvements based upon the contents disclosed here, without deviating from the scope of the present invention. Also, these changes and improvements are included in the present invention.

For example, the above embodiments were explained for the case where the fluid supply device included a hydrogen gas piping system, but other piping systems can be included, such as fuel or oil circulation paths.

As one example, if the fluid supply device according to the present invention is included in the oxydizing gas piping system (fluid supply piping) 11 connected on the upstream side of the humidifier 9, second filter means, a flexible portion, first filter means, and pressurizing means are provided in that order from the humidifier 9 in the upstream direction. The pressurizing means is for example an air compressor (flow pump) or similar that pressurizes oxygen gas taken in from the upstream side and transmits it to the humidifier 9.

The first filter means traps foreign matter in the oxygen gas, and is provided either within the pressurizing means or between the pressurizing means and the flexible portion. The second filter means traps foreign matter that deposited and agglomerated in the flexible portion, and is a filter whose filter accuracy is lower (coarser mesh) that of the first filter means. The flexible portion absorbs vibrations and shocks associated with the operation of the pressurizing means, so the flexible portion is formed from for example bellows shaped pipe, expansion joints, L-bends, Z-bends, U-bends, or similar.

Also, the second embodiment was explained above for the case where instead of the circulation side shutoff valve 20 (deposition prevention means), filter means 22 is provided on the discharge side of the second bellows pipe 21, but a configuration in which both the circulation side shutoff valve 20 and the filter means 22 are provided may also be used.

Also, the above embodiment was explained for the case that filter means 22 is arranged on the discharge side of the second bellows pipe 21, but if parts (flexible portion) that change the direction of the introduced fluid are arranged downstream of devices such as a hydrogen pump 19 or the like that generate foreign matter such as wear particles, the filter means 22 may be arranged on the discharge side of that piping.

For example, if it is necessary to arrange an L-shaped pipe on the discharge side of the hydrogen pump 19 for reasons associated with layout space, the fluid can easily stagnate in the L-shaped portion (part that changes the direction of the introduced hydrogen offgas), so similar to the case of the corrugations 213 of the second bellows pipe 21 agglomeration of foreign matter can occur, but by arranging the filter means 22 on the discharge side of the piping it is possible to remove the agglomerated deposited material.

The present invention is useful when piping having parts in which the introduced fluid can easily stagnate is arranged on the flow paths, for preventing the occurrence of problems to equipment arranged downstream, caused by foreign matter depositing at those parts on the flow path where the introduced fluid can easily stagnate, so the present invention can be widely used in fluid supply devices and fuel cell systems having such a requirement.

I claim:

1. A fuel cell system incorporating a fluid supply device in a reaction gas supply system, the fluid supply device comprising:
    a flexible portion midway in a fluid supply piping;
    first filter means that traps foreign matter in the fluid on an upstream side of the flexible portion;
    second filter means that traps foreign matter in the fluid discharged from the flexible portion on a downstream side of the flexible portion; and
    pressurizing means that pressurizes fluid taken in from the upstream side and transmits the fluid to the downstream side, provided upstream of the flexible portion,
    wherein the first filter means is provided within the pressurizing means or between the pressurizing means and the flexible portion,
    a filter accuracy of the second filter means is lower than a filter accuracy of the first filter means so that the second filter means filters the foreign matter that has passed through the first filter means but has agglomerated in the flexible portion, and
    the reaction gas supply system is a fuel gas supply system.

2. The fuel cell system according to claim 1, wherein the flexible portion is a bellows-shaped pipe.

3. The fuel cell system according to claim 1, wherein the pressurizing means is a fluid pump.

* * * * *